(12) United States Patent
Seigneur et al.

(10) Patent No.: US 10,195,759 B2
(45) Date of Patent: Feb. 5, 2019

(54) TIE STRAP WITH HARDENED INTEGRATED RIVET FOR A SAW CHAIN

(71) Applicant: Blount, Inc., Portland, OR (US)

(72) Inventors: Christopher D. Seigneur, West Linn, OR (US); Michael D. Harfst, Milwaukie, OR (US)

(73) Assignee: Blount, Inc., Portland, OR (US)

( * ) Notice: Subject to any disclaimer, the term of this patent is extended or adjusted under 35 U.S.C. 154(b) by 294 days.

(21) Appl. No.: 14/987,656

(22) Filed: Jan. 4, 2016

(65) Prior Publication Data

US 2016/0193749 A1    Jul. 7, 2016

Related U.S. Application Data

(60) Provisional application No. 62/100,852, filed on Jan. 7, 2015.

(51) Int. Cl.
| | |
|---|---|
| *B27B 33/14* | (2006.01) |
| *C21D 1/18* | (2006.01) |
| *C21D 1/42* | (2006.01) |
| *C21D 9/24* | (2006.01) |
| *C21D 1/52* | (2006.01) |
| *C21D 1/34* | (2006.01) |
| *C21D 1/08* | (2006.01) |

(Continued)

(52) U.S. Cl.
CPC ............... *B27B 33/14* (2013.01); *B21L 9/02* (2013.01); *B23D 65/00* (2013.01); *C21D 1/08* (2013.01); *C21D 1/09* (2013.01); *C21D 1/10* (2013.01); *C21D 1/18* (2013.01); *C21D 1/34* (2013.01); *C21D 1/42* (2013.01); *C21D 1/52* (2013.01); *C21D 9/24* (2013.01); *C23C 8/20* (2013.01); *C23C 8/24* (2013.01); *Y02P 10/253* (2015.11)

(58) Field of Classification Search
CPC .......... B27B 33/14; B27B 17/00; C21D 1/18; C21D 1/52; C21D 1/08; C21D 1/09; C21D 1/42; C21D 1/34; C21D 1/10; C21D 9/24; C23C 8/20; C23C 8/24; B23D 65/00; B21L 9/02; Y02P 10/253; Y10T 83/904; Y10T 83/9319; B28D 1/124; F16B 19/06
USPC ...................... 83/830, 835; 76/112
See application file for complete search history.

(56) References Cited

U.S. PATENT DOCUMENTS

| | | | |
|---|---|---|---|
| 4,037,403 A | 7/1977 | Lanz et al. | |
| 5,153,996 A * | 10/1992 | Kuzarov | A01G 3/053 30/216 |

(Continued)

*Primary Examiner* — Ghassem Alie
(74) *Attorney, Agent, or Firm* — Schwabe Williamson & Wyatt, P.C.

(57) ABSTRACT

Embodiments herein describe a tie strap with a hardened integrated rivet for a saw chain. The tie strap has a body with an integrated rivet extending therefrom and having a shoulder extending from the body and configured to engage a rivet hole of a connector link and a hub extending from the shoulder and configured to engage a rivet hole of an opposing tie strap. The shoulder has a high wear region and a low wear region disposed opposite from the high wear region, wherein the low wear region has a first hardness that is less than a second hardness of the high wear region. Generally, the high wear region extends circumferentially around the shoulder and is between about 90 degrees counter clockwise to about 90 degrees clockwise measured from a center point on the shoulder facing inward toward a center part of the body.

14 Claims, 12 Drawing Sheets

(51) Int. Cl.
  *C21D 1/10* (2006.01)
  *C21D 1/09* (2006.01)
  *C23C 8/20* (2006.01)
  *C23C 8/24* (2006.01)
  *B21L 9/02* (2006.01)
  *B23D 65/00* (2006.01)

(56) References Cited

U.S. PATENT DOCUMENTS

2007/0125219 A1 6/2007 Seigneur et al.
2013/0121788 A1* 5/2013 Yu .......................... B62M 9/00
                                                              411/501
2014/0260875 A1 9/2014 Harfst et al.

* cited by examiner

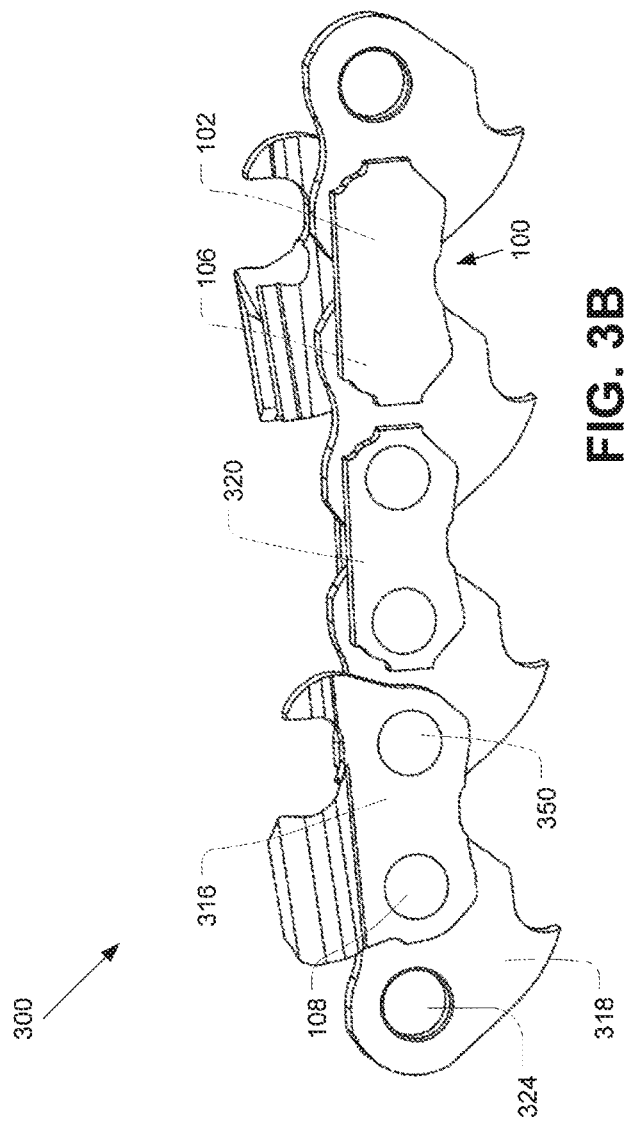

TIE STRAP WITH HARDENED INTEGRATED RIVET FOR A SAW CHAIN

CROSS REFERENCE TO RELATED APPLICATIONS

The present application claims priority to U.S. Provisional Patent Application No. 62/100,852, filed Jan. 7, 2015, entitled "Tie Strap with Hardened Integrated Rivet for a Saw Chain," the entire disclosure of which is hereby incorporated by reference in its entirety.

TECHNICAL FIELD

Embodiments herein relate to the field of saw chain, and, more specifically, to a tie strap with a hardened integrated rivet for a saw chain.

BACKGROUND

Saw chain for chain saws typically includes a plurality of links, such as cutter links, drive/connector links, and tie straps, coupled to one another by rivets. The rivets may be integrated rivets that form a part of a tie strap or a cutter link. A factor in saw chain life is rivet wear, which is related to surface hardness of a rivet. Integrated rivets have a high wear region on the shoulder of the rivet. After a certain amount of wear in these regions, a saw chain must be replaced. Replacement is costly due to the cost of a new saw chain but also costs associated with the time required to remove a worn out saw chain and install a new saw chain.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 3B is a side view of a saw chain, in accordance with some embodiments.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Figure 1A:
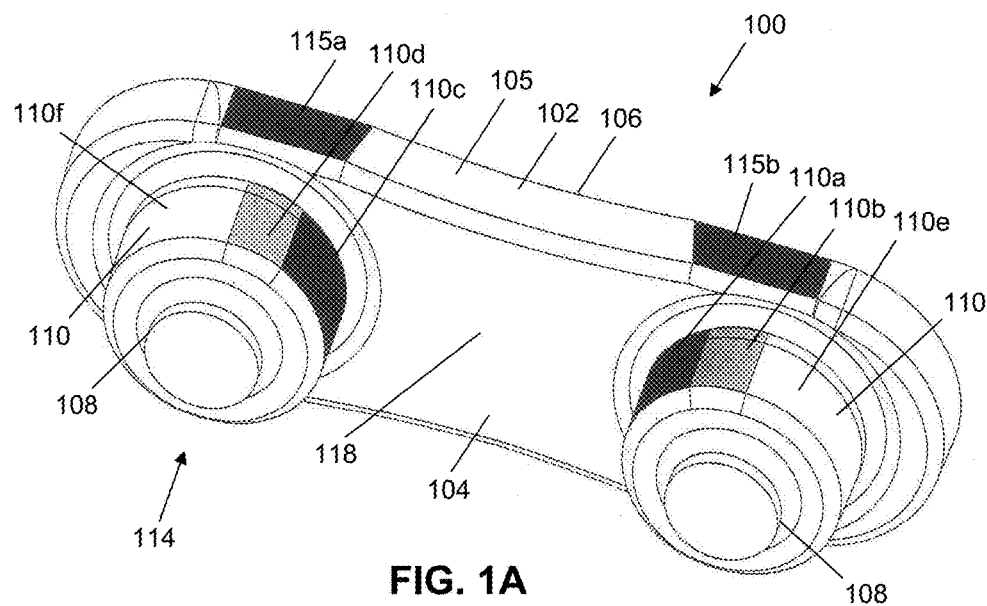
FIG. 1A is a bottom perspective view of a tie strap with a hardened integrated rivet for a saw chain, in accordance with some embodiments.

FIG. 1A is a bottom perspective view of a tie strap 100 with a hardened integrated rivet for a saw chain, in accordance with some embodiments. In some embodiments, the tie strap 100 may include a body 102 having a rivet side 104 and an integrated rivet 114, 116 extending from the rivet side 104 of the body 102 and comprised of a shoulder 110 extending from the rivet side 104 of the body 102 and configured to engage a rivet hole of another link (not shown) and a hub 108 extending from the shoulder 110 and configured to engage a rivet hole of an opposing tie strap (not shown), wherein a diameter of the hub 108 is less than a diameter of the shoulder 110, wherein the shoulder 110 has a high wear region 110a, 110b, 110c, 110d and a low wear region 110e, 110f disposed opposite from the high wear region 110a, 110b, 110c, 110d, wherein the low wear region 110e, 110f has a first hardness that is less than a second hardness of the high wear region 110a, 110b, 110c, 110d, wherein the high wear region 110a, 110b, 110c, 110d extends circumferentially around the shoulder 110 and is between about 90 degrees counter clockwise (FIG. 1B, 124) to about 90 degrees clockwise (FIG. 1B, 125) measured from a center point 126, 127 on the shoulder facing inward toward a center part 128 of the body 102. In some embodiments, the first hardness may be about 25 HRC to about 48 HRC. In some embodiments, the second hardness may be greater than about 48 HRC. In some embodiments, the second hardness may be greater than about 54 HRC. In some embodiments, the tie strap 100 may have an exposed side 106 opposite the rivet side 104 and a bottom edge 105 disposed between the rivet side 104 and the exposed side 106, wherein the bottom edge 105 may have a foot region 115a with a third hardness greater than the first hardness, wherein the foot region 115a may be configured to engage a rail of a guide bar in a first orientation of the tie strap 100. In some embodiments, the rivet side 104 and the exposed side 106 may be substantially flat. In some embodiments, the foot region 115a may have a corresponding additional foot region 115b disposed opposite the foot region 115a. In some embodiments, foot region 115a may be referred to as the toe and 115b be referred to as the heel. In some embodiments, the foot region 115a and the additional foot region 115b may have a hardness greater than the first hardness. In some embodiments, the hardness of the foot regions may be greater than 48 HRC or may be greater than 54 HRC. In some embodiments, the tie strap 100 may have a top edge 107 opposite the bottom edge 105 and where the top edge may have a foot region 115c with a hardness greater than the first hardness. In some embodiments, the top edge may have a second foot region 115d with a hardness greater than the first hardness. In some embodiments, the hardness of the top edge foot regions may be greater than about 48 HRC or greater than about 54 HRC. In some embodiments, the tie strap 100 may have a second integrated rivet 116.

Figure 1B:
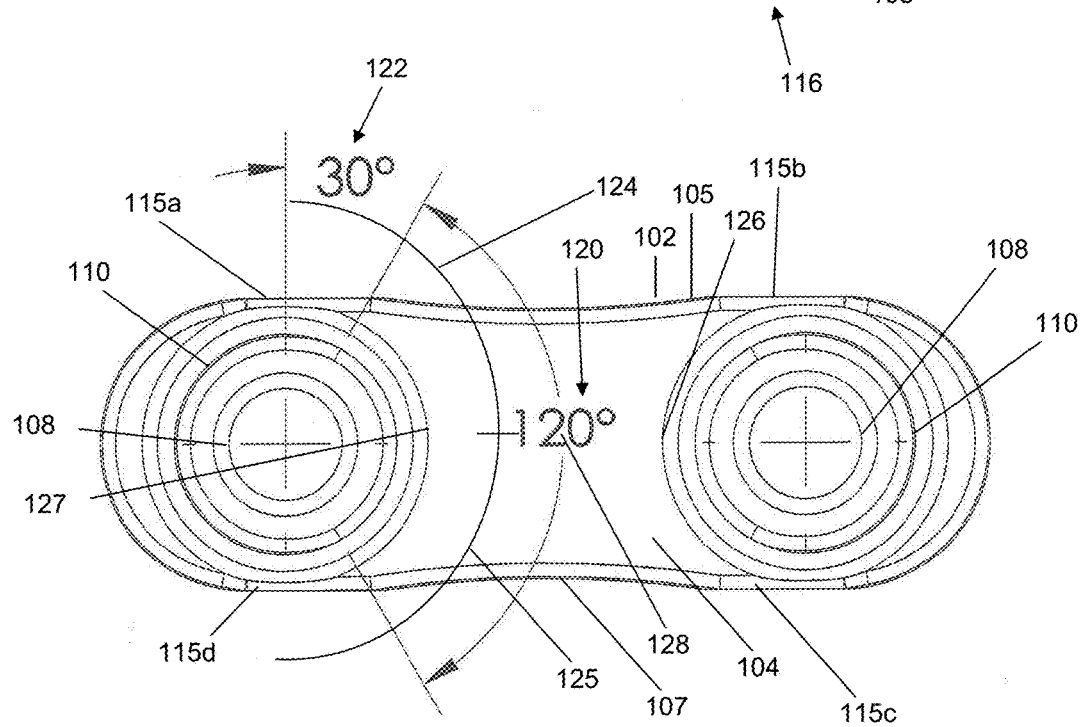
FIG. 1B is a side view of the tie strap on the side having a rivet extending from a body of the tie strap, in accordance with some embodiments.

FIG. 1B is a side view of the tie strap 100 on the side having a rivet extending from a body of the tie strap, in accordance with some embodiments. In some embodiments, the high wear region 110a, 110b, 110c, 110d extends circumferentially around the shoulder 110 and is between about 90 degrees counter clockwise 124 to about 90 degrees clockwise 125 measured from a center point 127 on the shoulder 110 facing inward toward a center part 128 of the body 102. In some embodiments, the high wear region 110a, 110b, 110c, 110d extends circumferentially around the shoulder 110 and is between about 60 degrees counter clockwise to about 60 degrees clockwise measured from a center point 127 on the shoulder 110 facing inward toward a center part 128 of the body 102.

Figure 2A:
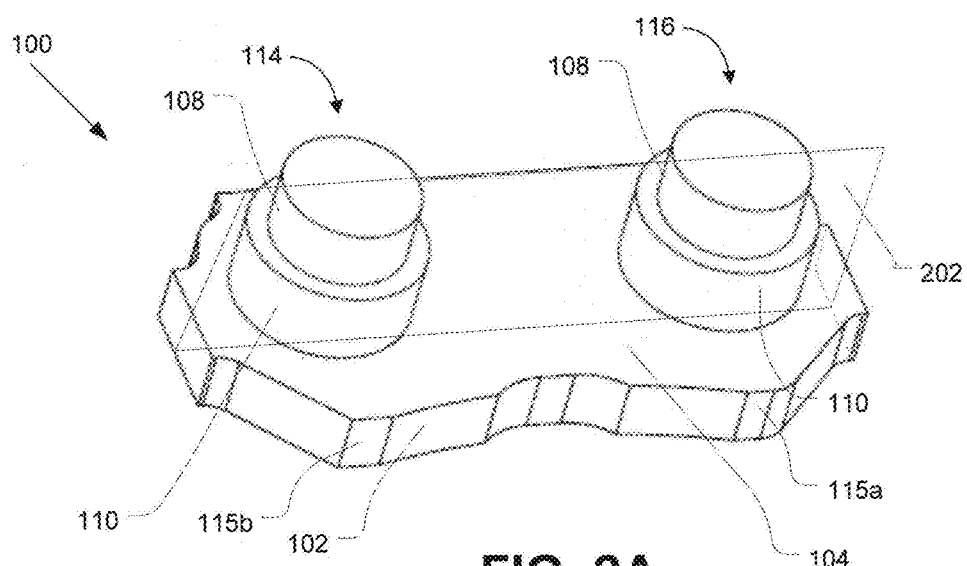
FIG. 2A is a perspective view of a tie strap with a plane illustrated passing through two integrated rivets in accordance with some embodiments.

FIG. 2A is a perspective view of a tie strap 100 with a plane 202 illustrated passing through two integrated rivets 114, 116, in accordance with some embodiments. In some embodiments, integrated rivet 114 has a first radial center line extended from the exposed side to the rivet side and passing through a center of the integrated rivet and the second integrated rivet has a second radial center line extended from the exposed side to the rivet side and passing through a center of the second integrated rivet, where the first radial center line and the second radial center line are parallel and define a plane 202 passing through the first radial center line and the second radial center line, wherein the high wear region of the integrated rivet 114 extends from the plane circumferentially along the shoulder 110 up to about 90 degrees counter clockwise and up to about 90 degrees clockwise, wherein the second high wear region of the second integrated rivet 116 extends from the plane circumferentially along the second shoulder 110 up to about 90 degrees counter clockwise and up to about 90 degrees clockwise.

Figure 2B:
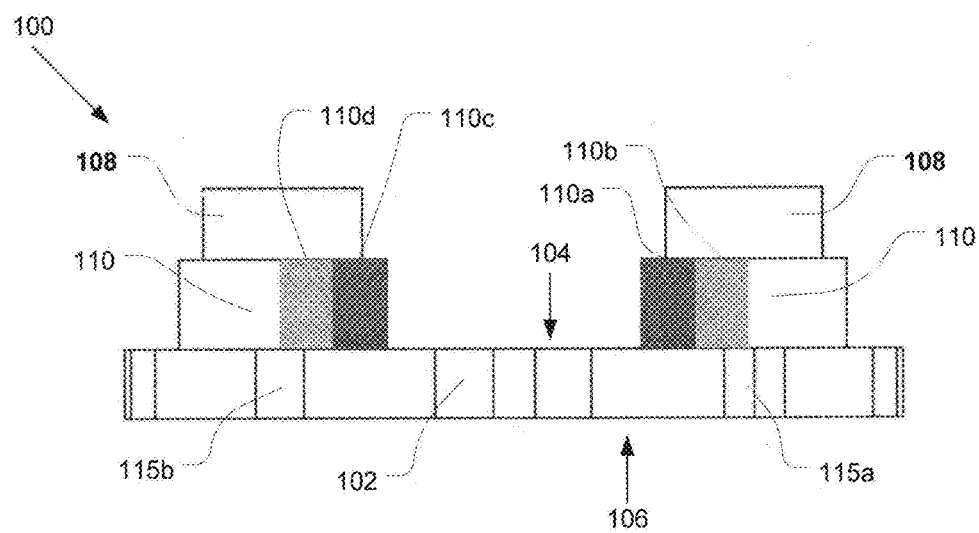
FIG. 2B is a top view of a tie strap, in accordance with some embodiments.

FIG. 2B schematically illustrates a top view of a tie strap 100, in accordance with some embodiments. In some embodiments, the high wear regions 110a, 110b, 110c, 110d may extend circumferentially around shoulder 110. In some embodiments, the high wear regions 110a, 110c may be hardened more than the high wear regions 110b, 110d. Thus, in embodiments, a high wear region of a rivet may be separated into multiple regions, for example with a higher hardness at the region most central along the rivet facing the inner, center line of the tie strap, and with a lower hardness at a region further away from the center line, such as more along the top or bottom of the rivet.

Figure 3A:
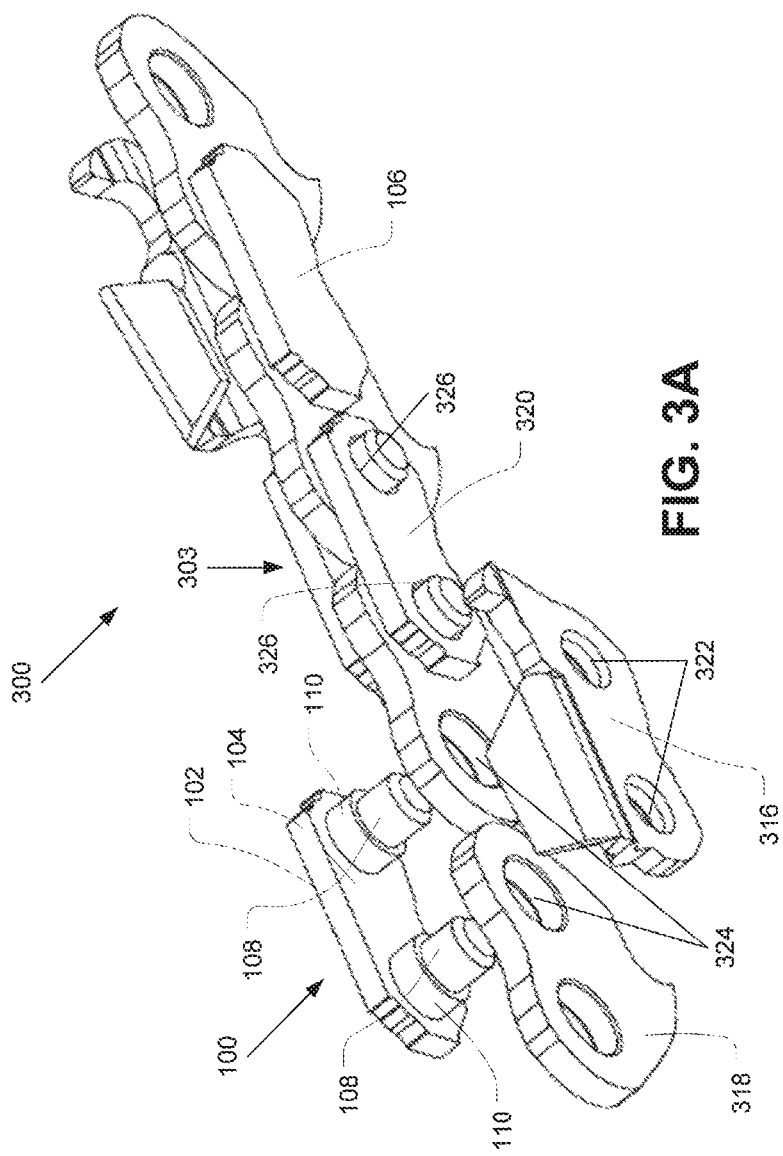
FIG. 3A is a partially exploded view of a saw chain including a plurality of tie straps, in accordance with some embodiments.

FIG. 3A illustrates a partial exploded view of a saw chain 300 including a plurality of tie straps 100, in accordance with some embodiments. In some embodiments, the saw chain 300 may include cutter links 316, drive links 318, and opposing tie straps 320. In some embodiments, the shoulders 110 of the integrated rivets 114, 116 of tie strap 100 may be disposed in respective rivet holes 324 of the adjacent drive links 318. In some embodiments, the hubs 108 of integrated rivets 114 and 116 may be disposed in respective rivet holes 322 of the cutter link 316. In some embodiments, the hubs 108 of another tie strap 303 are disposed in respective rivet holes 326 of the opposing tie strap 320. In some embodiments, the hubs 108 may be a long hub and may be spun to form rivet heads after being placed through the respective rivet holes. For example, FIG. 3B illustrates the saw chain 300 after the hubs 108 have been spun to form rivet heads 350 on the ends of integrated rivets 114 and 116. The rivet heads 350 may have a diameter that is greater than the diameter of the hub. In other embodiments, the rivet heads 350 may be formed by other means, such as by crushing the end of the rivet and/or striking a strike hole in the end of the rivet. Alternatively, the tie straps 100 may not include rivet heads. For example, the hubs 108 may be a short hub that may be welded to the respective rivet holes of the opposing tie strap or cutter link. In some embodiments, the shoulders 110 may be hardened in the high wear regions 110a, 110b, 110c, 110d.

Figure 4A:
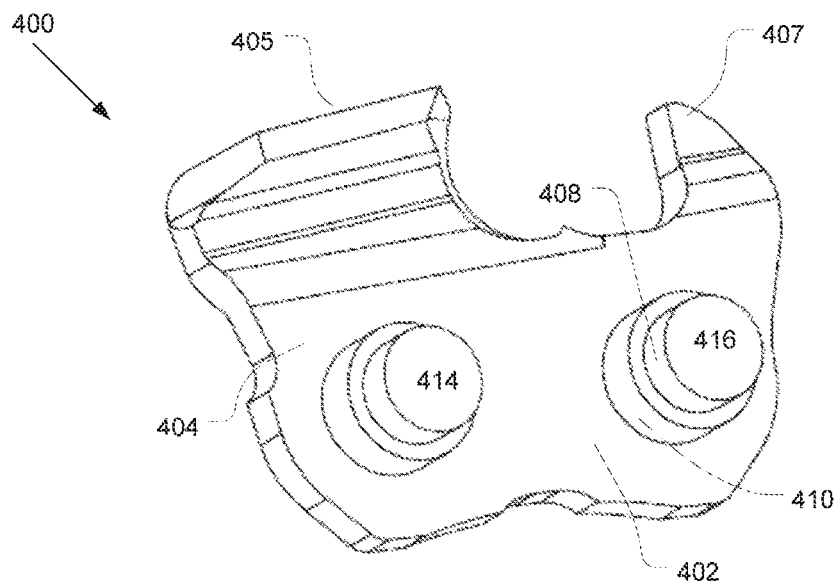
FIGS. 4A and 4B illustrate a cutter tie strap, in accordance with various embodiments.
Figure 4B:
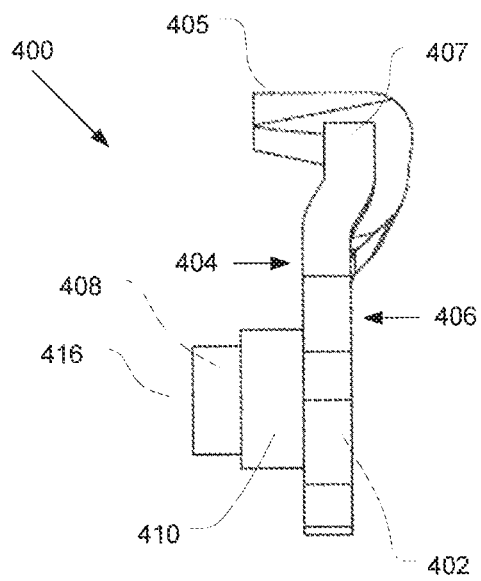

FIGS. 4A and 4B illustrate a cutter tie strap 400, in accordance with various embodiments. The cutter tie strap 400 includes a body 402 having a first side 404 and second side 406 that are substantially flat. The cutter tie strap includes a cutting element 405 and a depth gauge 407 extending upward from the body 402. The cutter tie strap 400 further includes two integrated rivets 414, 416 extending from the first side 404 of the body 402. The rivets 414, 416 include a shoulder 410 and a hub 408. The shoulder 410 is disposed between the body 402 and the hub 408, and has a diameter that is larger than a diameter of the hub 408. In some embodiments, the shoulder 410 of the rivets may be hardened in the high wear regions 110*a*, 110*b*, 110*c*, 110*d*.

Figure 5A:
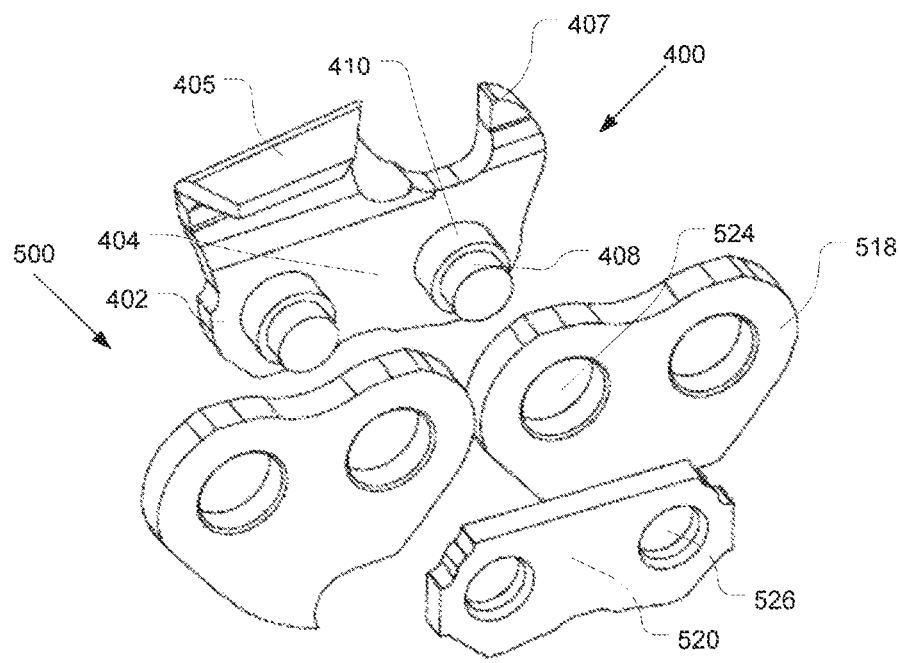
FIGS. 5A and 5B illustrate a saw chain that includes the cutter tie strap, in accordance with some embodiments.
Figure 5B:
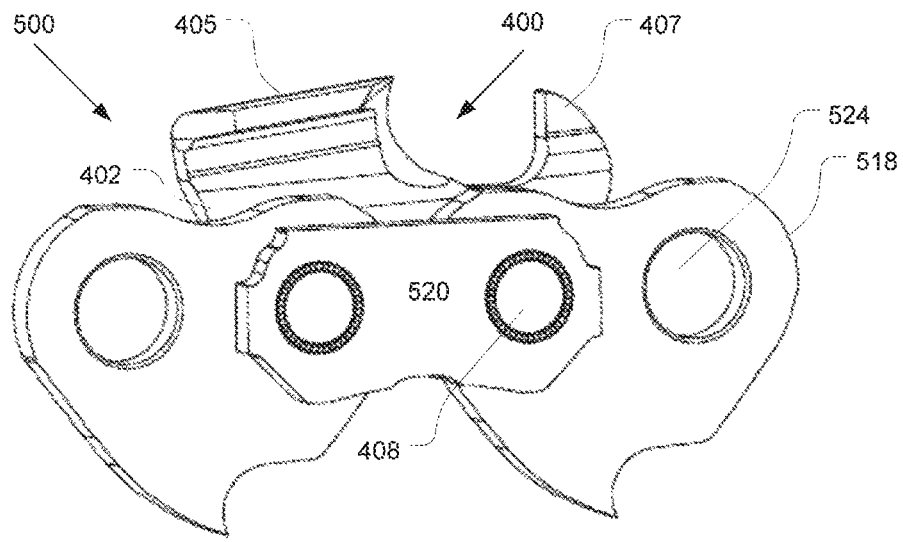

FIGS. 5A and 5B illustrate a saw chain 500 that includes the cutter tie strap 400, in accordance with some embodiments. The saw chain 500 further includes drive links 518 and opposing tie strap 520. The shoulders 410 of the rivets 414, 416 are disposed in respective rivet holes 524 of the drive links 518, and the hubs 408 are disposed in respective rivet holes 526 of the opposing tie strap 520. In some embodiments, the shoulders 410 of the rivets may be hardened in the high wear regions 110*a*, 110*b*, 110*c*, 110*d*.

Further, FIG. 5B illustrates the saw chain 500 with the hubs 408 welded to the opposing tie strap 520 via rivet holes 526. In other embodiments, the ends of the rivets 408 may be formed into rivet heads to secure the cutter tie strap 400 to the opposing tie strap 520. In some embodiments, the shoulders 410 of the rivets may be hardened in the high wear regions.

Figure 6:
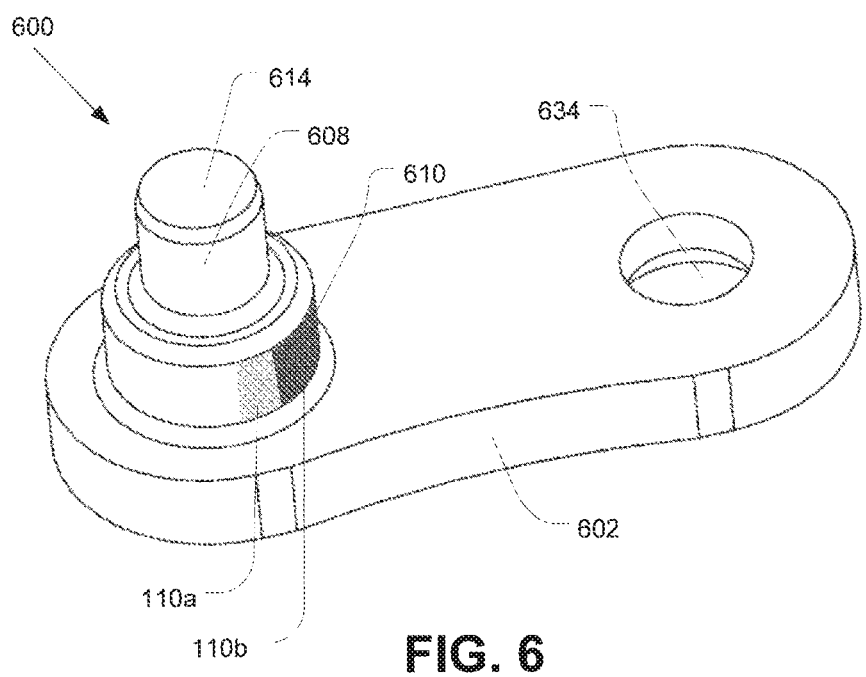
FIG. 6 is a perspective view of a tie strap with a hardened integrated rivet and a rivet hole, in accordance with some embodiments.

FIG. 6 is a perspective view of a tie strap 600 with a hardened integrated rivet for a saw chain and a rivet hole 634, in accordance with some embodiments. In some embodiments, the tie strap 600 may include an integrated rivet 614 with a collar 608 and a shoulder 610. In some embodiments, the shoulder 610 has a high wear region that is hardened 110*a*, 110*b*. In some embodiments, the tie strap 600 may have a rivet hole 634 configured to engage an integrated rivet of an opposing tie strap.

Figure 7:
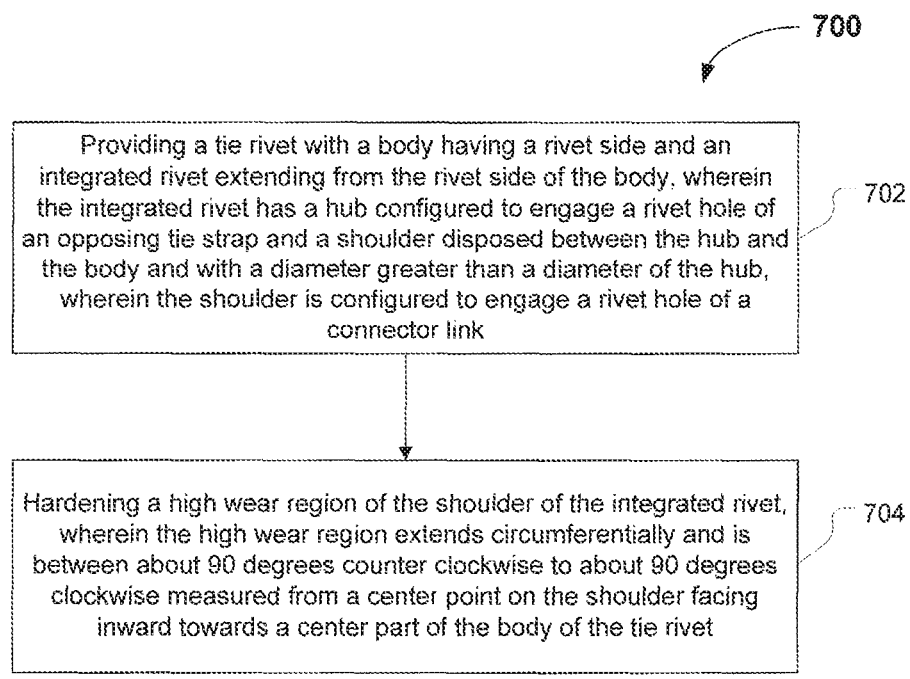
FIG. 7 schematically illustrates a method of fabricating a tie rivet with a hardened integrated rivet for a saw chain, in accordance with some embodiments.

FIG. 7 schematically illustrates a method of fabricating a tie rivet with a hardened integrated rivet for a saw chain (method) 700. In some embodiments, the method 700 may include providing a tie rivet 702 with a body having a rivet side and an integrated rivet extending from the rivet side of the body, wherein the integrated rivet has a hub configured to engage a rivet hole of an opposing tie strap and a shoulder disposed between the hub and the body and with a diameter greater than a diameter of the hub, wherein the shoulder is configured to engage a rivet hole of a connector link. In some embodiments, the method 700 may further include hardening a high wear region of the shoulder of the integrated rivet, wherein the high wear region extends circumferentially and is between about 90 degrees counter clockwise to about 90 degrees clockwise measured from a center point on the shoulder facing inward toward a center part of the body of the tie rivet (see 704). In some embodiments, the method 700 may include using a hardening method selected from the group consisting of flame hardening, induction hardening, laser hardening, electron beam hardening, ion implantation hardening, selective carburizing and nitride hardening, and arc lamp hardening, and combinations thereof.

Figure 8:
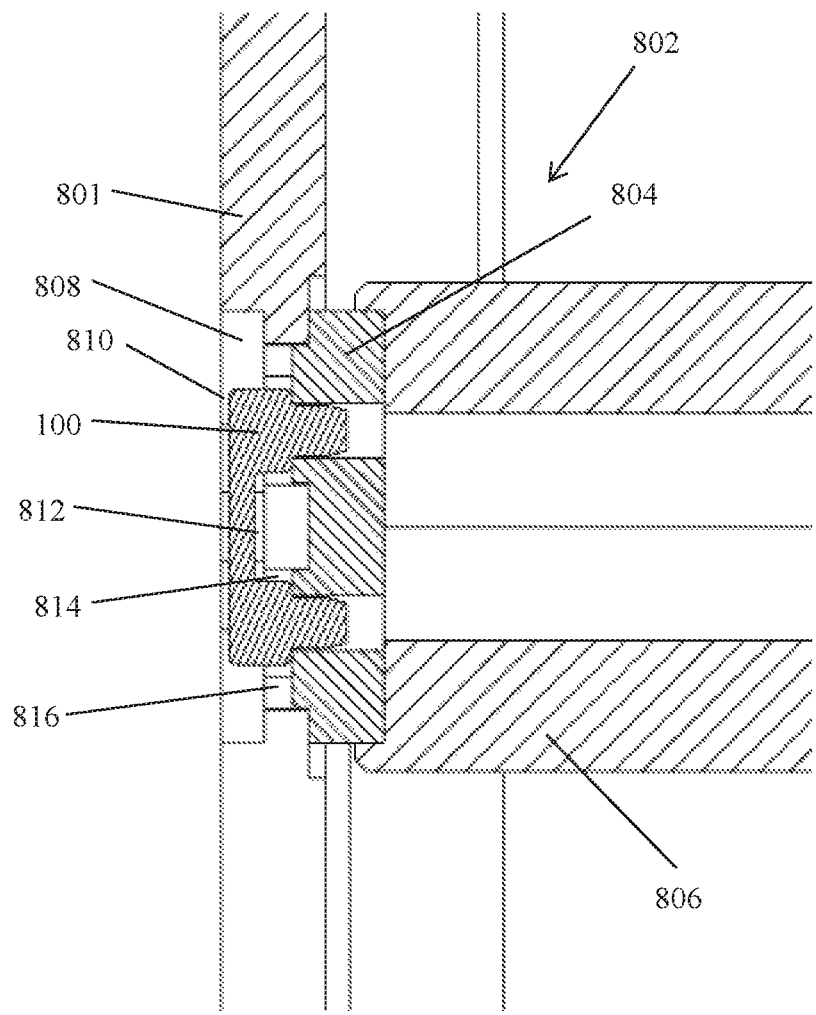
FIG. 8 is a cross-section of a jig with details of air gaps to control hardening an integrated rivet of a tie strap, in accordance with some embodiments.

FIG. 8 is a cross-section of a jig 802 with details of air gaps to control hardening an integrated rivet of a tie strap 100, in accordance with some embodiments. Jig 802 includes coil 801, a ceramic washer 804 to hold tie strap 100 in place, and a washer holder 806 to hold washer 804. Various air gaps are noted and are provided to control the location and extent of hardening. In embodiments, air gap 808 is about 0.093" and is designed to stop or impede generation of a heat affected zone. In embodiments, air gap 810 is about 0.015". In embodiments, air gap 812 is about 0.012". In embodiments, air gap 814 is about 0.015". In embodiments, air gap 816 is about 0.055".

Figure 9:
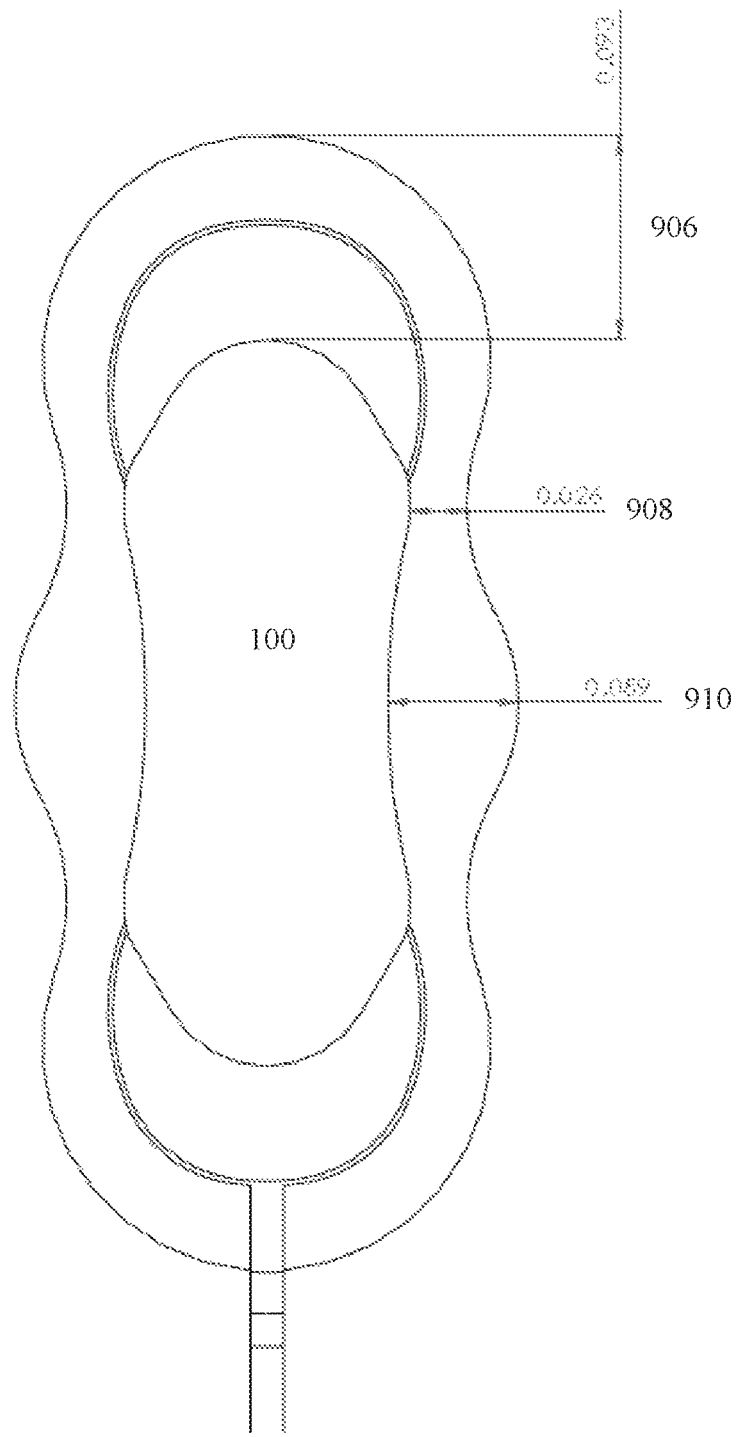
FIG. 9 illustrates air gaps to control the heat affected zone for hardening the outer profile of the tie strap, in accordance with some embodiments.

FIG. 9 illustrates air gaps to control the heat affected zone for hardening the outer profile of the tie strap 100, in accordance with some embodiments. Various air gaps are noted and are provided to control the location and extent of hardening. In embodiments, air gap 906 is about 0.093" and is designed to prevent generation of a heat affected zone at two locations around the perimeter of the tie strap 100. In embodiments, air gap 908 is about 0.026" and is designed to facilitate generation of heat affected zones at four locations around the perimeter of the tie strap 100. In embodiments, air gap 910 is about 0.059" and is designed to prevent generation of a heat affected zone around the perimeter of the tie strap 100.

Figure 10:
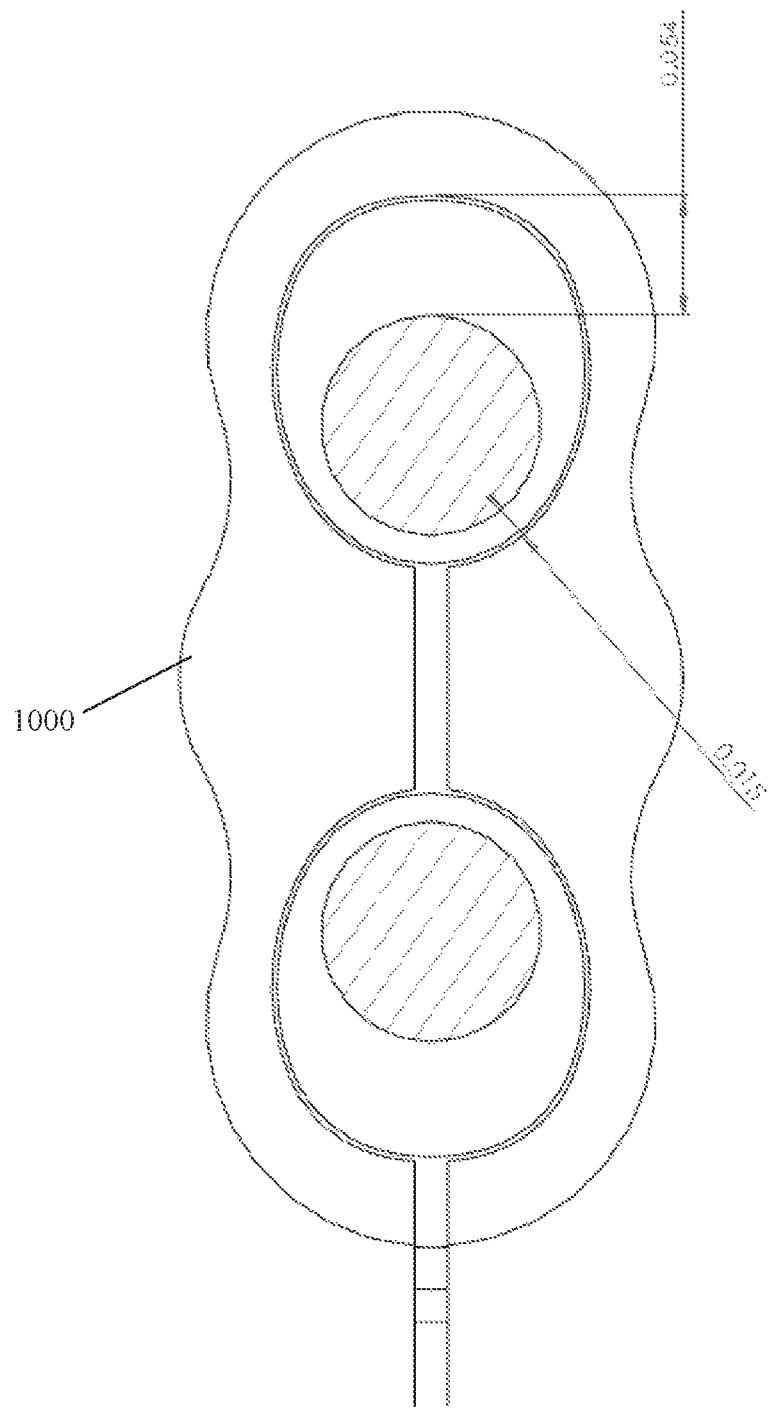
FIG. 10 illustrates a jig for holding a tie strap for hardening an integrated rivet, in accordance with some embodiments.

FIG. 10 illustrates a jig 1000 for holding a tie strap for hardening an integrated rivet, in accordance with some embodiments.

Figure 11:
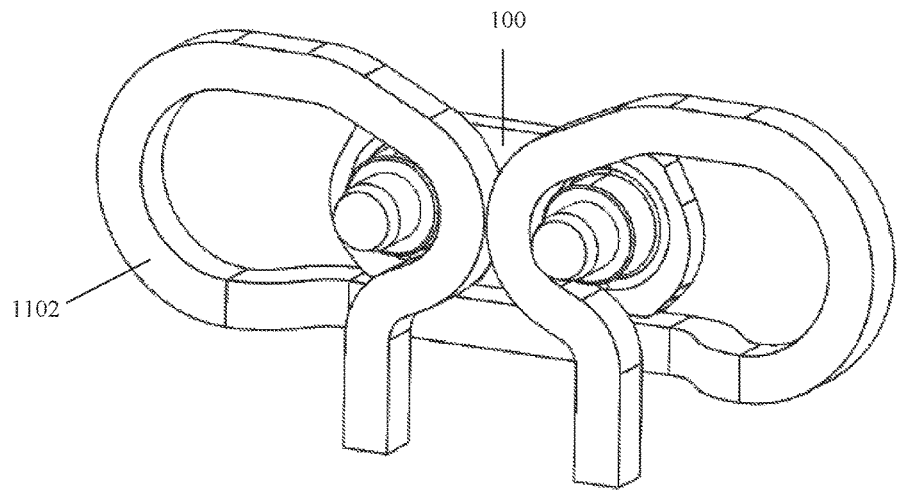
FIG. 11 is a perspective view of a tie strap with an integrated rivet engaged with an induction coil for hardening the integrated rivet, in accordance with some embodiments.
Figure 12:
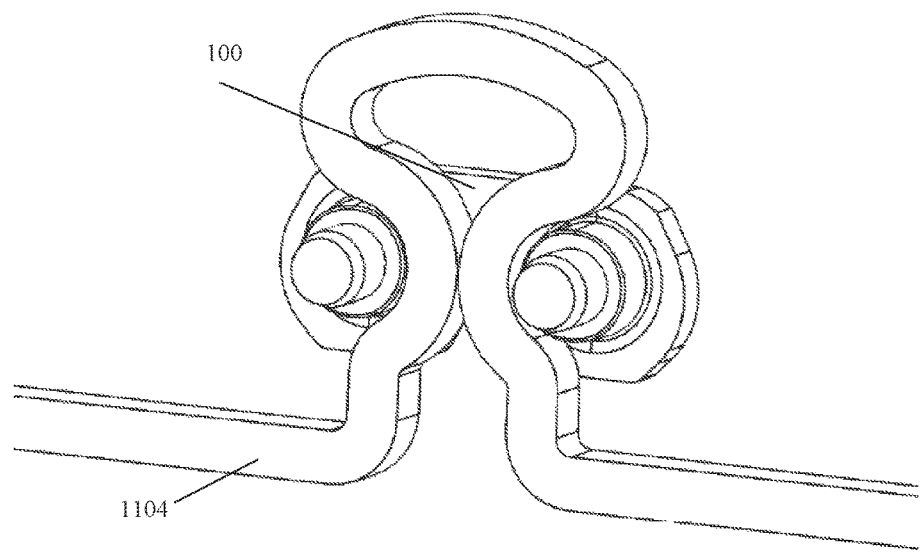
FIG. 12 is a perspective view of a tie strap with an integrated rivet engaged with an induction coil for hardening the integrated rivet, in accordance with some embodiments.

FIGS. 11 and 12 are perspective views of a tie strap 100 with integrated rivets engaged with an induction coil 1102 and 1104 for hardening the integrated rivet, in accordance with some embodiments.

EXAMPLES

According to various embodiments, the present disclosure describes a tie strap with a hardened integrated rivet for a saw chain. Example 1 of a tie strap with a hardened integrated rivet for a saw chain may include a body having a rivet side; and an integrated rivet extending from the rivet side of the body and comprised of: a shoulder extending from the rivet side of the body and configured to engage a rivet hole of a connector link; and a hub extending from the shoulder and configured to engage a rivet hole of an opposing tie strap, wherein a diameter of the hub is less than a diameter of the shoulder, wherein the shoulder has a high wear region and a low wear region disposed opposite from the high wear region, wherein the low wear region has a first hardness that is less than a second hardness of the high wear region, wherein the high wear region extends circumferentially around the shoulder and is between about 90 degrees counter clockwise to about 90 degrees clockwise measured from a center point on the shoulder facing inward toward a center part of the body.

Example 2 may include the tie strap of Example 1, wherein the tie strap has an exposed side opposite the rivet side and an edge side disposed between the rivet side and the exposed side, wherein the edge side has a foot region with a third hardness greater than the first hardness, wherein the foot region is configured to engage a rail of a guide bar in a first orientation of the tie strap.

Example 3 may include the tie strap of Example 2, wherein the rivet side and exposed side of the body are substantially flat.

Example 4 may include the tie strap of Example 2, wherein the foot region is comprised of a first foot region and a second foot region, wherein the first foot region is disposed opposite the second foot region on the edge side, wherein the first foot region has a fourth hardness and the second foot region has a fifth hardness, wherein the fourth and fifth hardness are greater than the first hardness, wherein the first and second foot regions are configured to engage the rail of the guide bar in the first orientation of the tie strap.

Example 5 may include the tie strap of Example 4, wherein the tie strap has a top edge opposite the bottom edge and disposed between the rivet side and the exposed side, wherein the top edge has a top edge foot region with a sixth hardness greater than the first hardness, wherein the top edge foot region is configured to engage the rail of the guide bar in a second orientation of the tie strap.

Example 6 may include the tie strap of Example 5, wherein the top edge foot region is comprised of a third foot region and a fourth foot region, wherein the third foot region is disposed opposite the fourth foot region on the top edge, wherein the third foot region has a seventh hardness and the fourth foot region has an eighth hardness, wherein the seventh and eighth hardness are greater than the first hardness, wherein the third and fourth foot regions are configured to engage the rail of the guide bar in the second orientation of the tie strap.

Example 7 may include the tie strap of any of Examples 1-6, wherein the tie strap is further comprised of a second integrated rivet extending from the rivet side of the body and disposed opposite to the integrated rivet, wherein the second integrated rivet is comprised of: a second shoulder extending from the rivet side of the body and configured to engage a second rivet hole of a second connector link; and a second hub extending from the second shoulder and configured to engage a second rivet hole of a second opposing tie strap, wherein a diameter of the second hub is less than a diameter of the second shoulder, wherein the second shoulder has a second high wear region and a second low wear region disposed opposite from the second high wear region, wherein the second low wear region has the first hardness and the first hardness is less than a hardness of the second high wear region, wherein the high wear region of the integrated rivet faces the second high wear region of the second integrated rivet, both facing inward toward the center part of the body, wherein the second high wear region extends circumferentially around the second shoulder and is between about 90 degrees counter clockwise to about 90 degrees clockwise measured from a center point on the second shoulder facing inward toward the center part of the body.

Example 8 may include the tie strap of Example 1, wherein the tie strap further comprises a rivet hole disposed in the body opposite to the integrated rivet and configured to engage a hub of another tie strap.

Example 9 may include the tie strap of Example 1, further comprising a cutting element extended upward from the body and further comprising a cutting gage element extended upward from the body.

Example 10 of a method of fabricating a tie rivet with a hardened integrated rivet for a saw chain may include providing a tie rivet with a body having a rivet side and an integrated rivet extending from the rivet side of the body, wherein the integrated rivet has a hub configured to engage a rivet hole of an opposing tie strap and a shoulder disposed between the hub and the body and with a diameter greater than a diameter of the hub, wherein the shoulder is configured to engage a rivet hole of a connector link; and hardening a high wear region of the shoulder of the integrated rivet, wherein the high wear region extends circumferentially and is between about 90 degrees counter clockwise to about 90 degrees clockwise measured from a center point on the shoulder facing inward toward a center part of the body of the tie rivet.

Example 11 may include the method of Example 10, wherein hardening further comprises treating the high wear region with a hardening method selected from the group consisting of flame hardening, induction hardening, laser hardening, electron beam hardening, ion implantation hardening, selective carburizing and nitride hardening, and arc lamp hardening, and combinations thereof.

Example 12 of a saw chain may include a drive link having a rivet hole; a first tie strap disposed on a first side of the drive link and having a rivet hole; and a second tie strap comprising: a body having a rivet side; and an integrated rivet extending from the rivet side of the body, wherein the integrated rivet has a shoulder extending from the body and disposed in the rivet hole of the drive link and a hub extending from the shoulder and disposed in the rivet hole of the first tie strap, wherein a diameter of the hub is less than a diameter of the shoulder, wherein the shoulder has a high wear region and a low wear region disposed opposite from the high wear region, wherein the low wear region has a first hardness that is less than a second hardness of the high wear region, wherein the high wear region extends circumferentially and is between about 90 degrees counter clockwise to about 90 degrees clockwise measured from a center point on the shoulder facing inward toward a center part of the body of the tie rivet.

Example 13 may include the saw chain of Example 12, wherein the drive link is a first drive link, wherein the saw chain further includes a second drive link having a rivet hole, wherein the integrated rivet is a first integrated rivet, and wherein the second tie strap further includes a second integrated rivet extending from the rivet side of the body, the second integrated rivet having a second shoulder disposed in the rivet hole of the second drive link and a second hub disposed in another rivet hole of the first tie strap, wherein a diameter of the second hub is less than a diameter of the second shoulder, wherein the second shoulder has a high wear region and a low wear region disposed opposite from the high wear region, wherein the low wear region has a third hardness that is less than a fourth hardness of the high wear region, wherein the high wear region extends circumferentially from about 90 degrees counter clockwise to about 90 degrees clockwise measured from a center point on the second shoulder facing inward toward the center part of the body.

Example 14 may include the saw chain of Example 12, wherein the drive link is a first drive link, wherein the saw chain further includes a second drive link having a rivet hole, wherein the second tie strap includes a rivet hole, and wherein the first tie strap further comprises: a first body having the rivet hole of the first tie strap and having a first rivet side facing the first and second drive links, and a second integrated rivet extending from the first rivet side of the first body, wherein the second integrated rivet has a second shoulder extending from the first rivet side of the first body and disposed in the rivet hole of the second drive link and a second hub extending from the second shoulder and disposed in the rivet hole of the second tie strap, wherein a diameter of the second hub is less than a diameter of the second shoulder, wherein the second shoulder has a high wear region and a low wear region disposed opposite from the high wear region, wherein the low wear region has a third hardness that is less than a fourth hardness of the high wear region, wherein the high wear region extends circumferentially and is between about 90 degrees counter clockwise to about 90 degrees clockwise measured from a center point on the second shoulder facing inward toward a center part of the first body.

Example 15 may include the saw chain of Example 12, wherein the integrated rivet includes a rivet head extending from the hub and rotatably engaged to the first tie strap.

Example 16 may include the saw chain of Example 12, wherein the first tie strap has a first rivet side facing the drive link and a first exposed side opposite the first rivet side and a first edge side disposed between the first rivet side and the first exposed side, wherein the first edge side has a first foot region with a third hardness greater than the first hardness, wherein the first foot region is configured to engage a rail of a guide bar in a first orientation of the saw chain, wherein the second tie strap has a second exposed side opposite the rivet side and a second edge side disposed between the rivet side and the second exposed side, wherein the second edge side has a second foot region with a fifth hardness greater than the first hardness, wherein the second foot region is configured to engage the rail of the guide bar in the first orientation of the saw chain.

Example 17 may include the saw chain of Example 12, wherein the second tie strap is further comprised of a second integrated rivet extending from the rivet side of the body and disposed opposite to the integrated rivet, wherein the second integrated rivet is comprised of: a second shoulder extending from the rivet side of the body and disposed in a rivet hole of a second drive link; and a second hub extending from the second shoulder and disposed in a rivet hole of a second opposing tie strap, wherein a diameter of the second hub is less than a diameter of the second shoulder, wherein the second shoulder has a second high wear region and a second low wear region disposed opposite from the second high wear region, wherein the second low wear region has the first hardness and the first hardness is less than a third hardness of the second high wear region, wherein the high wear region of the integrated rivet faces the second high wear region of the second integrated rivet, both facing inward toward the center part of the body, wherein the second high wear region extends circumferentially around the second shoulder and is between about 90 degrees counter clockwise to about 90 degrees clockwise measured from a center point on the second shoulder facing inward toward the center part of the body.

Example 18 may include the saw chain of Example 12, wherein the second tie strap further comprises a cutting element extended upward from the body and further comprises a cutting gage element extended upward from the body.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A tie strap with a hardened integrated rivet for a saw chain, comprising:
   a body having a rivet side; and
   an integrated rivet extending from the rivet side of the body and comprised of:
      a shoulder extending from the rivet side of the body and configured to engage a rivet hole of another link; and
      a hub extending from the shoulder and configured to engage a rivet hole of an opposing tie strap, wherein a diameter of the hub is less than a diameter of the shoulder, wherein the shoulder has a high wear region and a low wear region disposed opposite from the high wear region, wherein the low wear region has a first hardness that is less than a second hardness of the high wear region, wherein the high wear region extends circumferentially around the shoulder and is between about 90 degrees counter clockwise to about 90 degrees clockwise measured from a center point on the shoulder facing inward toward a center part of the body,
   wherein the tie strap has an exposed side opposite the rivet side and a bottom edge disposed between the rivet side and the exposed side, wherein the bottom edge has a foot region with a third hardness greater than the first hardness, wherein the foot region is configured to engage a rail of a guide bar in a first orientation of the tie strap.

2. The tie strap of claim 1, wherein the rivet side and exposed side of the body are substantially flat.

3. The tie strap of claim 1, wherein the foot region is comprised of a first foot region and a second foot region, wherein the first foot region is disposed opposite the second foot region on the bottom edge, wherein the first foot region has a fourth hardness and the second foot region has a fifth hardness, wherein the fourth and fifth hardness are greater than the first hardness, wherein the first and second foot regions are configured to engage the rail of the guide bar in the first orientation of the tie strap.

4. The tie strap of claim 3, wherein the tie strap has a top edge opposite the bottom edge and disposed between the rivet side and the exposed side, wherein the top edge has a top edge foot region with a sixth hardness greater than the first hardness, wherein the top edge foot region is configured to engage the rail of the guide bar in a second orientation of the tie strap.

5. The tie strap of claim 4, wherein the top edge foot region is comprised of a third foot region and a fourth foot region, wherein the third foot region is disposed opposite the fourth foot region on the top edge, wherein the third foot region has a seventh hardness and the fourth foot region has an eighth hardness, wherein the seventh and eighth hardness are greater than the first hardness, wherein the third and fourth foot regions are configured to engage the rail of the guide bar in the second orientation of the tie strap.

6. The tie strap of claim 1, wherein the tie strap is further comprised of a second integrated rivet extending from the rivet side of the body and disposed opposite to the integrated rivet, wherein the second integrated rivet is comprised of:
   a second shoulder extending from the rivet side of the body and configured to engage a rivet hole of another link; and
   a second hub extending from the second shoulder and configured to engage a rivet hole of the opposing tie strap,
   wherein a diameter of the second hub is less than a diameter of the second shoulder,
   wherein the second shoulder has a second high wear region and a second low wear region disposed opposite from the second high wear region,
   wherein the second low wear region has the first hardness and the first hardness is less than a hardness of the second high wear region,
   wherein the high wear region of the integrated rivet faces the second high wear region of the second integrated rivet, both facing inward toward the center part of the body, wherein the second high wear region extends circumferentially around the second shoulder and is between about 90 degrees counter clockwise to about 90 degrees clockwise measured from a center point on the second shoulder facing inward toward the center part of the body.

7. The tie strap of claim 1, wherein the tie strap further comprises a rivet hole disposed in the body opposite to the integrated rivet and configured to engage a hub of another tie strap.

8. The tie strap of claim 1, further comprising a cutting element extended upward from the body and further comprising a cutting element extended upward from the body.

9. A saw chain comprising:
- a drive link having a rivet hole;
- a first tie strap disposed on a first side of the drive link and having a rivet hole; and
- a second tie strap comprising:
  - a body having a rivet side; and
  - an integrated rivet extending from the rivet side of the body, wherein the integrated rivet has a shoulder extending from the body and disposed in the rivet hole of the drive link and a hub extending from the shoulder and disposed in the rivet hole of the first tie strap, wherein a diameter of the hub is less than a diameter of the shoulder, wherein the shoulder has a high wear region and a low wear region disposed opposite from the high wear region, wherein the low wear region has a first hardness that is less than a second hardness of the high wear region, wherein the high wear region extends circumferentially and is between about 90 degrees counter clockwise to about 90 degrees clockwise measured from a center point on the shoulder facing inward toward a center part of the body of the tie rivet,
  - wherein the second tie strap has an exposed side opposite the rivet side and a bottom edge disposed between the rivet side and the exposed side, wherein the bottom edge has a foot region with a third hardness greater than the first hardness, wherein the foot region is configured to engage a rail of a guide bar in a first orientation of the tie strap.

10. The saw chain of claim 9, wherein the drive link is a first drive link, wherein the saw chain further includes a second drive link having a rivet hole, wherein the integrated rivet is a first integrated rivet, and wherein the second tie strap further includes a second integrated rivet extending from the rivet side of the body, the second integrated rivet having a second shoulder disposed in the rivet hole of the second drive link and a second hub disposed in another rivet hole of the first tie strap, wherein a diameter of the second hub is less than a diameter of the second shoulder, wherein the second shoulder has a high wear region and a low wear region disposed opposite from the high wear region, wherein the low wear region has a fourth hardness that is less than a fifth hardness of the high wear region, wherein the high wear region extends circumferentially from about 90 degrees counter clockwise to about 90 degrees clockwise measured from a center point on the second shoulder facing inward toward the center part of the body.

11. The saw chain of claim 9, wherein the drive link is a first drive link, wherein the saw chain further includes a second drive link having a rivet hole, wherein the second tie strap includes a rivet hole, and wherein the first tie strap further comprises:
- a first body having the rivet hole of the first tie strap and having a first rivet side facing the first and second drive links, and
- a second integrated rivet extending from the first rivet side of the first body, wherein the second integrated rivet has a second shoulder extending from the first rivet side of the first body and disposed in the rivet hole of the second drive link and a second hub extending from the second shoulder and disposed in the rivet hole of the second tie strap, wherein a diameter of the second hub is less than a diameter of the second shoulder, wherein the second shoulder has a high wear region and a low wear region disposed opposite from the high wear region, wherein the low wear region has a fourth hardness that is less than a fifth hardness of the high wear region, wherein the high wear region extends circumferentially and is between about 90 degrees counter clockwise to about 90 degrees clockwise measured from a center point on the second shoulder facing inward toward a center part of the first body.

12. The saw chain of claim 9, wherein the integrated rivet includes a rivet head extending from the hub and rotatably engaged to the first tie strap.

13. The saw chain of claim 9, wherein the second tie strap is further comprised of a second integrated rivet extending from the rivet side of the body and disposed opposite to the integrated rivet, wherein the second integrated rivet is comprised of:
- a second shoulder extending from the rivet side of the body and disposed in a rivet hole of a second drive link; and
- a second hub extending from the second shoulder and disposed in a rivet hole of a second opposing tie strap,
- wherein a diameter of the second hub is less than a diameter of the second shoulder,
- wherein the second shoulder has a second high wear region and a second low wear region disposed opposite from the second high wear region,
- wherein the second low wear region has the first hardness and the first hardness is less than a hardness of the second high wear region,
- wherein the high wear region of the integrated rivet faces the second high wear region of the second integrated rivet, both facing inward toward the center part of the body, wherein the second high wear region extends circumferentially around the second shoulder and is between about 90 degrees counter clockwise to about 90 degrees clockwise measured from a center point on the second shoulder facing inward toward the center part of the body.

14. The saw chain of claim 9, wherein the second tie strap further comprises a cutting element extended upward from the body and further comprises a cutting element extended upward from the body.

* * * * *